US012775059B2

(12) United States Patent
Yi et al.

(10) Patent No.: US 12,775,059 B2
(45) Date of Patent: Oct. 27, 2026

(54) MEASUREMENT DEVICE OF ZENITH ANGLE

(71) Applicant: Beijing Normal University, Beijing (CN)

(72) Inventors: Yujun Yi, Beijing (CN); Kebing Chen, Beijing (CN)

(73) Assignee: Beijing Normal University, Beijing (CN)

( * ) Notice: Subject to any disclaimer, the term of this patent is extended or adjusted under 35 U.S.C. 154(b) by 890 days.

(21) Appl. No.: 18/187,362

(22) Filed: Mar. 21, 2023

(65) Prior Publication Data

US 2023/0314545 A1 Oct. 5, 2023

(30) Foreign Application Priority Data

Mar. 22, 2022 (CN) ......................... 202210284192.8

(51) Int. Cl.

*G01S 3/78* (2006.01)
*G01S 3/781* (2006.01)
*G01S 3/786* (2006.01)
*H02S 20/32* (2014.01)

(52) U.S. Cl.

CPC ............ *G01S 3/7861* (2013.01); *G01S 3/781* (2013.01); *H02S 20/32* (2014.12)

(58) Field of Classification Search

CPC .. G01C 1/00; G01C 1/08; G01S 3/781; G01S 3/7861; H02S 20/32; Y02E 10/50
See application file for complete search history.

(56) References Cited

U.S. PATENT DOCUMENTS

2007/0215199 A1* 9/2007 Dold ........................ H02S 20/23 136/246
2017/0244355 A1 8/2017 Yanagi
2023/0402961 A1* 12/2023 Fakhari ................. F24S 30/455

FOREIGN PATENT DOCUMENTS

CN 202974258 U 6/2013
CN 103403898 A 11/2013
CN 105652336 A 6/2016
CN 213041229 U 4/2021
JP 2015074382 A 4/2015

* cited by examiner

*Primary Examiner* — Alfred Basichas
(74) *Attorney, Agent, or Firm* — Andrus Intellectual Property Law, LLP

(57) ABSTRACT

Embodiments of the present disclosure disclose a measuring device of zenith angle, which relates to the technical field of angle measurement and is used to measure solar zenith angle. A light receiving member includes solar panels, a support frame with a regular pyramid structure, and a first counterweight member. Light intensity processing circuits are electrically connected to the solar panels and determine a rotation angle of the support frame based on intensity of light received by each solar panel; a direction adjusting member is electrically connected to the light intensity processing circuits to adjust angles of the support frame in both vertical direction and horizontal direction. The embodiments of the present disclosure have a simple structure, and can avoid limitations on placement angles of the device, measure a zenith angle quickly and accurately, reduce measurement costs, and be made into a small-sized device to facilitate outdoor carrying.

8 Claims, 5 Drawing Sheets

MEASUREMENT DEVICE OF ZENITH ANGLE

CLAIM OF PRIORITY AND CROSS-REFERENCE TO RELATED APPLICATION(S)

This application claims the benefit of Chinese Patent Application No. 202210284192.8, filed on Mar. 22, 2022, which is incorporated herein by reference in its entirety.

BACKGROUND OF THE DISCLOSURE

1. Field of the Disclosure

The present disclosure relates to the technical field of angle measurement, and in particular, to a zenith angle measuring device.

2. Description of the Related Art

Zenith refers to a celestial point directly above the observer's head, which is one of two points where a plumb line extends infinitely and intersects a celestial sphere. Remote sensing monitoring is a technique that uses sensors to collect data about objects or areas from a distance, such as by satellites or drones. It has important applications in various aspects such as agriculture and forestry. The solar zenith angle is an angle between an incident direction of sunlight and a zenith direction, and affects how much sunlight reaches an object or area and how it reflects back to the sensor. Changes in the solar zenith angle may cause deviations in remote sensing monitoring indicators. Therefore, measuring and correcting the solar zenith angle is essential for the accurate remote sensing monitoring. The current methods for obtaining solar zenith angle is mostly rely on GPS information and astrological knowledge, but these methods do not account for atmospheric interference that can alter solar zenith angle values from their theoretical ones. Some alternative technologies use optical sensors in combination with single chip microcomputers to measure zenith angle in situ, but this approach is costly and requires more equipment.

BRIEF DESCRIPTION OF THE DISCLOSURE

In view of this, the objective of the present disclosure aims to overcome the problems of the prior art, and it provides a device that can measure zenith angle easily, accurately, and cheaply.

The device for measuring zenith angle according to the present disclosure has four main components: (1) Light receiving member: This component This component including solar panels, a support frame, and a first counterweight member. Where the support frame is of a regular pyramid structure, a corresponding position of each inclined plane of the support frame is covered with the same solar panel, and the first counterweight member is connected to the support frame. (2) Light intensity processing circuits: These circuits electrically connected to the solar panels and configured to determine a rotating angle of the support frame based on intensity of light received by each solar panel. (3) Direction adjusting member: This component connected to the light intensity processing circuits electrically. It adjust angles of the support frame in vertical direction and horizontal direction, where the angle of the support frame in the vertical direction is equal to zenith angle. (4) Stability maintaining base, This component including a bracket, a first fixing member, and a second fixing member, where the first fixing member is rotatably connected to the bracket, the second fixing member is rotatably connected to the first fixing member, and the direction adjusting member is rotatably connected to the second fixing member.

Further, the direction adjusting member includes a shaft rod and a second counterweight member, where the first motor is fixed to one end of the shaft rod, and a power output shaft of the first motor is fixedly connected to the support frame and the first counterweight member; the shaft rod is fixedly connected to a turntable, and the turntable is rotatably connected to the second fixing member; and second counterweight member is fixedly connected to the second fixing member, and a second motor is fixed to the second counterweight member, and a power output shaft of the second motor is fixedly connected to the other end of the shaft rod.

Further, in any of the foregoing solutions, first shafts are connected to two opposite positions of the bracket respectively, and the two first shafts are arranged coaxially; second shafts connect to opposite positions of the first fixing member, and the two second shafts are arranged coaxially; and the first shafts and the second shafts are perpendicular to each other.

Further, in any of the foregoing solutions, the bracket includes a fixing ring and at least three legs, the first fixing member and the second fixing member are of ring structures and are concentric with the fixing ring. The legs connect evenly around the fixing ring. The second counterweight member fits inside the space formed by the fixing ring and the legs. Two first shafts are coaxial with a diameter of the fixing ring and are connected to the fixing ring respectively; and two second shafts are coaxial with a diameter of the first fixing member and are connected to the first fixing member respectively.

Further, in any of the foregoing solutions, the first motor and the second motor are electrically connected to the solar panels, respectively.

Further, in any of the foregoing solutions, diodes are arranged between the solar panels and the first motor, and between the solar panels and the second motor, respectively.

Further, in any of the foregoing solutions, a 90° protractor is fixed to the shaft rod, a pointer is fixed to the support frame, and the pointer indicates the zenith angle on the protractor.

Further, in any of the foregoing solutions, the support frame has a regular square pyramid structure with four same solar panels on each slanted side, where the difference in the intensity of light received by one group of solar panels arranged on the opposite inclined planes determines the rotating angle of the support frame in the vertical direction; and the difference in the intensity of light received by the other group of solar panels arranged on the opposite inclined planes determines the rotating angle of the support frame in the horizontal direction.

Based on the foregoing measuring device of zenith angle provided by the present disclosure: The solar panels assembled on the regular pyramid support frame receive sunlight, a deflection angle of the support frame is determined based on the difference in the intensity of light received by the solar panels on the inclined planes; The light intensity processing circuits cooperate with the direction adjusting member to adjust the support frame in the vertical direction and the horizontal direction, so that the support frame always faces the sun. And the stability maintaining base maintains the direction adjusting member upright. This allows for an accurate measurement zenith angle.

BRIEF DESCRIPTION OF THE DRAWINGS

The foregoing and other objectives, features and advantages of the present disclosure will become more apparent from the following description of embodiments of the present disclosure with reference to the accompanying drawings, in which.

Figure 1:
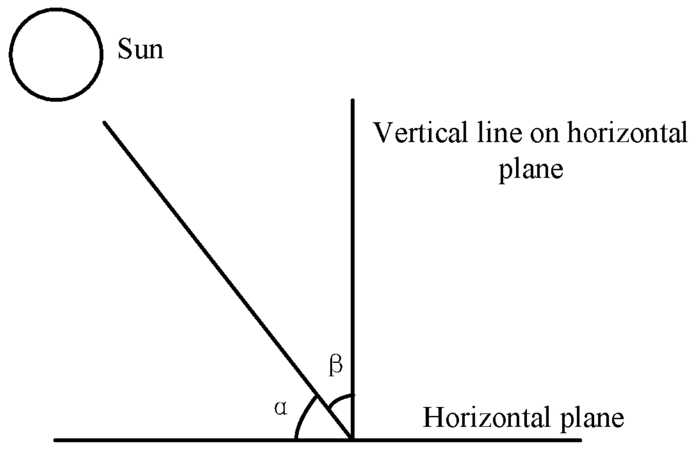
FIG. 1 is a schematic diagram of a zenith angle.

Reference numerals: β—zenith angle; α—complement angle of the zenith angle; 1—light receiving member; 11—solar panel; 12—support frame; 13—first counterweight member; 2—light intensity processing circuit; 3—direction adjusting member; 31—shaft rod; 32—second counterweight member; 33—first motor; 34—turntable; 35—second motor; 4—stability maintaining base; 41—bracket; 411—fixing ring; 412—leg; 42—first fixing member; 43—second fixing member; 44—first shaft; 45—second shaft; 5—protractor; and 6—pointer.

DETAILED DESCRIPTION OF EMBODIMENTS OF THE DISCLOSURE

The present disclosure is described below based on embodiments, but the present disclosure is not only limited to these embodiments. In the following detailed description of the present disclosure, some specific details are described in detail. The present disclosure may be fully understood by those skilled in the art without the description of these detailed parts. Some well-known methods, processes, flows, elements and circuits are not described in detail to avoid confusing the substance of the present disclosure.

In addition, it should be understood by those of ordinary skill in the art that the drawings provided herein are for illustrative purposes, and the drawings are not necessarily drawn to scale.

Unless expressly required in the context, the terms "include", "comprise", and other similar words should be construed as inclusive rather than exclusive or exhaustive, that is, the meaning of "including, but not limited to".

In the description of the present disclosure, the terms "first", "second", and the like are merely used for descriptive purposes, but cannot be understand as indicating or implying relative importance. Moreover, in the description of the present disclosure, unless otherwise stated, "a plurality of" means two or more.

Unless otherwise specified and limited, the terms "mounted", "connected", "connection", "fixed", and the like should be understood broadly. For example, the "connection" may be a fixed connection, a detachable connection, or an integrated connection, may be a mechanical connection or an electrical connection, may be a direct connection or an indirect connection by means of an intermediate medium, or may be an internal connection of two elements or an interaction between two elements. The specific meanings of the terms in the present disclosure may be understood according to specific situations by those of ordinary skill in the art.

In related technologies, when observing a celestial body through an astronomical telescope, it is necessary to locate the celestial body according to its equatorial coordinates or hour angle coordinates, so as to obtain zenith angle of the celestial body. The sun is used as an example of the celestial body. FIG. 1 is a schematic diagram of a zenith angle, where β is the zenith angle, a is a complement angle of the zenith angle, and both a and β are angles formed in a horizontal-vertical coordinate system. In an actual operation process, factors such as locations, time, weather conditions affect obtaining zenith angle data. In particular, observed data need to be regressed to a horizontal or vertical direction of gravity at an observer's position for calculation to obtain accurate zenith angle data. This not only increases costs of observation equipment and computing equipment but also cannot obtain reliable zenith angle data.

Embodiments of the present disclosure aim to solve the problems existing in related technologies above by providing a zenith angle measuring device that has a simple structure with a wide application range without needing conversion between horizontal direction coordinate data/angle data or a vertical direction coordinate data/angle data while obtaining more accurate angle data.

Figure 2:
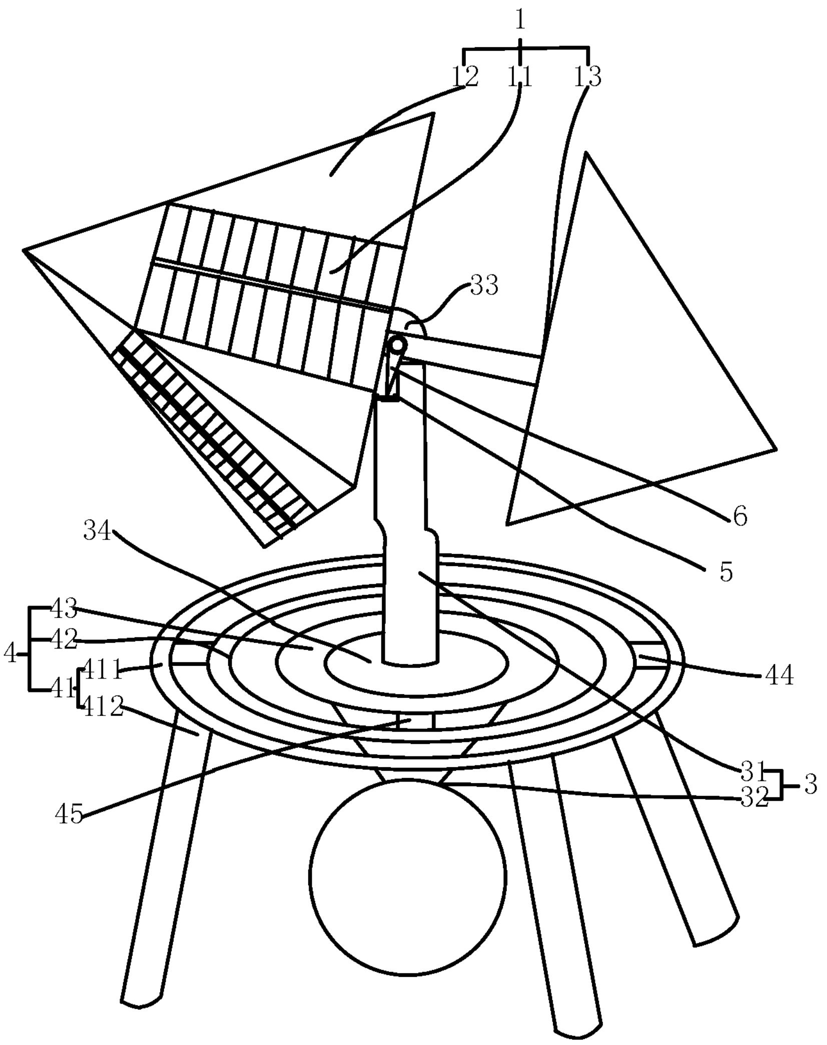
FIG. 2 is a schematic structural diagram of an embodiment of a zenith angle measuring device of the present disclosure.

FIG. 2 is a schematic structural diagram of an embodiment of a zenith angle measuring device of the present disclosure. As shown in FIG. 2, the zenith angle measuring device of the present embodiment may include a light receiving member 1, light intensity processing circuits 2, a direction adjusting member 3, and a stability maintaining base 4. The light receiving member 1 may include solar panels 11, a support frame 12, and a first counterweight member 13. The support frame 12 is of a regular pyramid structure, a corresponding position of each inclined plane of the support frame 12 is covered with the same solar panel 11, and the first counterweight member 13 is connected to the support frame 12. The light intensity processing circuits 2 may be electrically connected to the solar panels 11 and are configured to determine a rotating angle of the support frame 12 based on intensity of light received by each solar panel 11. The direction adjusting member 3 may be electrically connected to the light intensity processing circuits 2 to adjust angles of the support frame 12 in a vertical direction and a horizontal direction, and the angle of the support frame 12 in the vertical direction is zenith angle. The stability maintaining base 4 may include a bracket 41, a first fixing member 42, and a second fixing member 43, where the first fixing member 42 is rotatably connected to the bracket 41, the second fixing member 43 is rotatably connected to the first fixing member 42, and the direction adjusting member 3 is rotatably connected to the second fixing member 43.

In this embodiment, the light receiving member 1 may be a combination of the solar panels 11 and the support frame 12. The support frame 12 may be of a regular square pyramid structure with four identical isosceles triangular plates and a square plate or may be of a regular square pyramid frame structure. The same solar panel 11 is arranged at the corresponding position of each inclined plane of support frame 12 of the regular square pyramid. The solar panel 11 arranged on each inclined plane of the support frame 12 may be single solar panel or an array composed of two or more solar panels, which is not specifically defined in this embodiment. In this embodiment, the same solar panel 11 is arranged at the corresponding position of each inclined plane of the support frame 12, so that the corresponding position of each inclined plane can be illuminated by sunlight at the same probability, and errors in angular deflection of the support frame 12 caused by the arrangement of the support frame 12 or the solar panels 11 are avoided.

The support frame 12 is of a regular square pyramid structure, and the same solar panels 11 are arranged on the inclined planes, so that the solar panels 11 may receive the sunlight simultaneously from upper, lower, front, and rear sides. The solar panels 11 on the four inclined planes are divided into two groups: a first group comprising the solar panels 11 arranged on the opposite inclined planes; and a second group comprising the solar panels 11 arranged on the other two opposite inclined planes that are perpendicular to the first group. The difference in the intensity of light received by the first group of solar panels 11 determines the rotating angle of the support frame 12 in the vertical direction; and the difference in the intensity of light received by the second group of solar panels 11 determines the rotating angle of the support frame 12 in the horizontal direction. The light intensity processing circuits 2 convert the difference in the intensity of light received by the same group of solar panels 11 on two inclined planes into electrical signals, which controlling the direction adjusting member 3 to adjust the rotating angles of the support frame 12 in the vertical direction and the horizontal direction.

The angle of the support frame 12 is adjusted through the direction adjusting member 3 based on the intensity difference of the same group of solar panels 11, so that the irradiation intensity of the sunlight received by the solar panel 11 on each inclined plane is the same, and an effect that a tip of the support frame 12 faces the sun is achieved, thereby determining a solar zenith angle according to the angle of deflection of the support frame 12 in the vertical direction.

The determination of the solar zenith angle depends on the vertical direction or the horizontal direction. In this embodiment, the effect of gravity of the support frame 12 and the solar panels 11 is considered, and the first counterweight member 13 is provided to balance the gravity of the support frame 12 and the solar panels 11, so that the mass of the first counterweight member 13 is equal to that of the support frame 12 and the solar panels 11 and the distances between centers of gravity and a power output shaft of a first motor 33 are the equal which can effectively avoid deflection of the entire zenith angle measuring device due to changes in the centers of gravity when the angles of the support frame 12 and the solar panels 11 change in the vertical direction, and ensure stability of the zenith angle measuring device in this embodiment during use and accuracy of measurement of the solar zenith angle.

Figure 7:
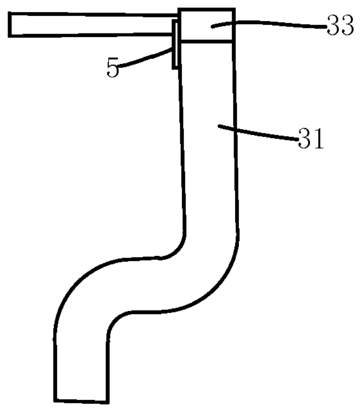
FIG. 7 is a partial schematic structural diagram of still another embodiment of a zenith angle measuring device of the present disclosure.

Further, a shape of the first counterweight member 13 in this embodiment may be a pyramid structure that is the same or similar to the support frame 12, a spherical or hemispherical structure, or another structure that can balance the gravity of the support frame 12 and the solar panels 11. Further, when a connecting rod between the support frame 12 and the first counterweight member 13 rotates to the vertical direction, the first counterweight member 13 should also be not in contact with a shaft rod 31 to prevent the shaft rod 31 from affecting the measurement of the zenith angle. Specifically, As shown in FIG. 7, which is a partial schematic structural diagram of another embodiment of a zenith angle measuring device of the present disclosure, the shaft rod 31 may be configured as a partially curved rod structure. This embodiment does not define a specific shape of the first counterweight member 13.

As shown in FIG. 2, the first fixing member 42 and the second fixing member 43 in the stability maintaining base 4 of this embodiment may be used in conjunction to adjust the light receiving member 1, the light intensity processing circuits 2, and the direction adjusting member 3 always in the vertical direction. When the zenith angle measuring device of this embodiment is placed at an incline and uneven surface, the deflection of the first fixing member 42 and the second fixing member 43 and the bracket 41 maintain the zenith angle measuring device of this embodiment always in the same horizontal-vertical coordinate system to measure a solar zenith angle.

In a specific operation process, the bracket 41 of this embodiment is placed at a preset position. The levelness of the position is not required excessively. The position may be in a plane parallel to the horizontal plane or at an angle within a set angle range from the horizontal plane. The position may be in a plane or be a position at a height difference. This embodiment does not define the position herein. When the bracket 41 is placed at a plane parallel to the horizontal plane, the first fixing member 42 and the second fixing member 43 may be on the same plane; when the bracket 41 is placed at an uneven position or at an angle with the horizontal plane, the plane where the first fixing member 42 and the second fixing member 43 are located produces an angle deviation to maintain the light receiving member 1, the light intensity processing circuits 2, and the direction adjusting member 3 vertical, so that the solar zenith angle measured by the support frame 12 is accurate; and no manual operations are required to adjust directions of the light receiving member 1 and the direction adjusting member 3, so the structure is simple and adjustment costs of solar zenith angle measurement are reduced.

Figure 3:
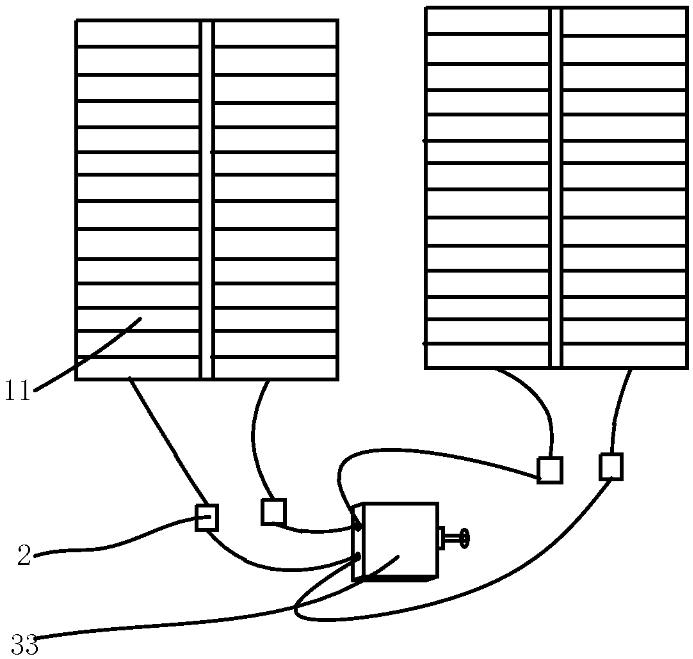
FIG. 3 is a schematic structural diagram of assembly of solar panels and a first motor.

In some embodiments, FIG. 3 is a schematic structural diagram of assembly of solar panels and a first motor. As shown in FIG. 2 and FIG. 3, the direction adjusting member 3 may include a shaft rod 31 and a second counterweight member 32, where the second counterweight member 32 is fixedly connected to the second fixing member 43, a first motor 33 is fixed to one end of the shaft rod 31, and a power output shaft of the first motor 33 is fixedly connected to the support frame 12 and the first counterweight member 13; the shaft rod 31 is fixedly connected to a turntable 34, and the turntable 34 is rotatably connected to the second fixing member 43; and a second motor 35 is fixed to the second counterweight member 32, and a power output shaft of the second motor 35 is fixedly connected to the other end of the shaft rod 31. In this embodiment, the shaft rod 31 is connected to the second counterweight member 32, and the turntable 34 is rotatably connected to the second fixing member 43, which can maintain the shaft rod 31 in the vertical direction, without any angular deflection from the vertical direction due to the placement of the bracket 41, thereby ensuring the accuracy of measurement of the solar zenith angle.

The first motor 33 is arranged at one end of the shaft rod 31 and electrically connected to the light intensity processing circuits 2. After receiving the electrical signals from the light intensity processing circuits 2, the first motor 33 controls the rotating angles of the support frame 12 and the first counterweight member 13 in the vertical direction. In this process, light intensity difference signals may be generated by the solar panels 11 on the upper and lower inclined planes of the support frame 12 due to different illumination. The second motor 35 is arranged inside the second counterweight member 32 and maintains relatively stationary with respect to the second fixing member 43. After receiving the electrical signals from the light intensity processing circuits 2, the second motor 35 may control the rotation of shaft rod 31 in the horizontal plane, so as to drive the light intensity of the solar panels 11 on the front and rear sides of the support frame 12 to tend to be the equal, and eliminate the light intensity difference between the solar panels 11 on the front and rear sides of the support frame 12. There is no light intensity difference between the solar panels 11 on the upper and lower inclined planes of the support frame 12 and the solar panels 11 on the front and rear inclined planes of the support frame 12. The solar zenith angle obtained in this status is stable and accurate.

Figure 8:
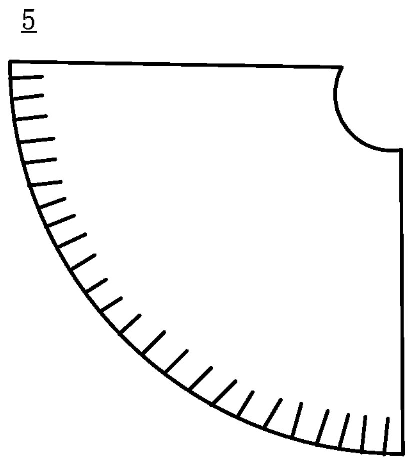
FIG. 8 is a schematic structural diagram of an embodiment of a protractor.

In some embodiments, as shown in FIG. 2, the shaft rod 31 may be fixed with a protractor 5 in an angle range of 0-90°, 90° in the horizontal direction, and 0° in the vertical direction. Specifically, FIG. 8 is a schematic structural diagram of an embodiment of a protractor. As shown in FIG. 8, the protractor 5 may be provided with a notch at its center, which matches the power output shaft of the first motor 33. The protractor 5 may be integrally formed with the shaft rod 31 or connected to the shaft rod 31 by other means such as adhesive bonding. A pointer 6 may be fixed to the power output shaft of the first motor 33, or fixed to the connecting rod between the support frame 12 and the first counterweight member 13. The pointer 6 indicates the zenith angle on the protractor 5. In this embodiment, a tip of the pointer 6 may point to a scale of the protractor 5, and a tail end of the pointer 6 is also connected to the support frame 12 and the first counterweight member 13 to maintain a relative position with the two unchanged and rotate synchronously with the two.

The pointer 6 may be detachably connected to the support frame 12 and the first counterweight member 13. Specifically, the pointer 6 may be detachably connected to one of the support frame 12 and the first counterweight member 13. If the support frame 12 and the first counterweight member 13 are integrally formed, the pointer 6 may also be integrally formed with the two. The pointer 6 may alternatively be integrally formed with the support frame 12 or the first counterweight member 13. The integral connection between the pointer 6 and the support frame 12 or the first counterweight member 13, or between the pointer 6 and the support frame 12 and the first counterweight member 13, is located at the power output shaft of the first motor 33 to ensure that the rotating angle of the pointer 6 is the same as that of the support frame 12, thereby measuring an accurate solar zenith angle.

In a specific example, the support frame 12 and the first counterweight member 13 may be connected by a connecting rod, and a middle part of the connecting rod may be sleeved on the power output shaft of the first motor 33. A hole is formed at the tail end of pointer 6, and the hole connects the tail end of the pointer 6 to the connecting rod by the power output shaft of the first motor. Further, the line connecting the tip of the support frame 12 and the tail end of the pointer 6 is perpendicular to a center line of the pointer 6. In this case, the deflection angle of the pointer 6 in the vertical direction is the solar zenith angle $\beta$.

Figure 5:
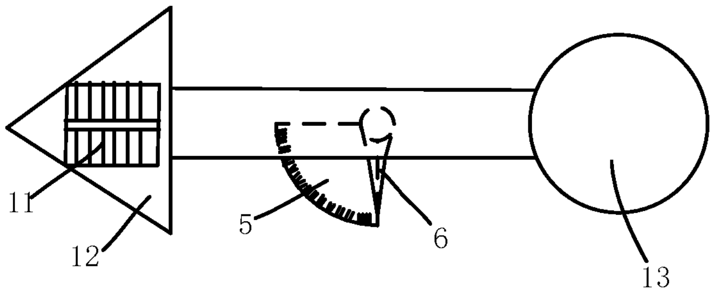
FIG. 5 is a partial schematic structural diagram of still another embodiment of a zenith angle measuring device of the present disclosure.
Figure 6:
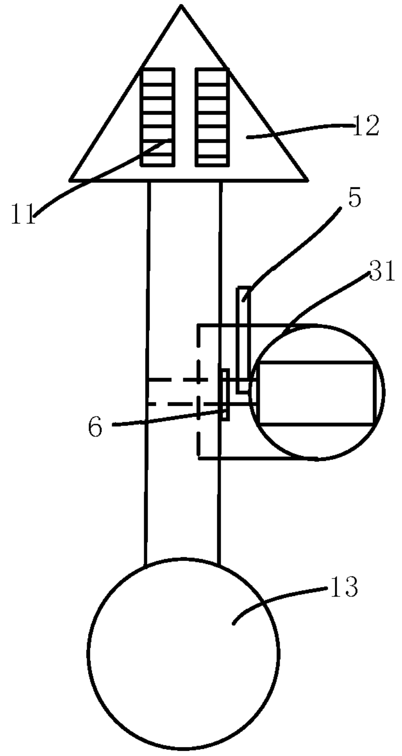
FIG. 6 is a partial schematic structural diagram of still another embodiment of a zenith angle measuring device of the present disclosure.

FIG. 5 is a partial schematic structural diagram of still another embodiment of a zenith angle measuring device of the present disclosure; and FIG. 6 is a partial schematic structural diagram of still another embodiment of a zenith angle measuring device of the present disclosure, where FIG. 5 is a side view, and FIG. 6 is a top view. As shown in FIG. 5 to FIG. 7, the shaft rod 31 may be configured as a curved rod structure, which on the one hand may avoid contact interference with the shaft rod 31 when the first counterweight member 13 rotates a large angle. On the other hand, a part of the gravity of the shaft rod 31 and the light receiving member 1 may be balanced, all the gravity of the light receiving member 1 is prevented from being borne by the power output shaft of the first motor 33, the gravity of the light receiving member 1 is balanced, and overall balance of the zenith angle measuring device of this embodiment is maintained.

In some embodiments, the first motor 33 and the second motor 35 are electrically connected to the solar panels 11, respectively. Electrical energy generated by the solar panels 11 may be supplied to the first motor 33 and the second motor 35, so that the whole zenith angle measuring device of this embodiment does not require an external power supply, and energy consumption is reduced. In some embodiments, diodes (not shown) are arranged between the solar panels 11 and the first motor 33, and between the solar panels 11 and the second motor 35 respectively to maintain circuit stability, avoid damage of excessive current to the solar panels, the first motor 33, and the second motor 35, ensure overall structural safety, and isolate each solar panel 11 from each other.

Further, with continued reference to FIG. 2, in some embodiments, first shafts 44 may be connected to two opposite positions of the bracket 41 respectively, and the two first shafts 44 are arranged coaxially; second shafts 45 are connected to two opposite positions of the first fixing member 42 respectively, and the two second shafts 45 are arranged coaxially; and the first shafts 44 and the second shafts 45 are perpendicular to each other. The shaft rod 31 placed at an uneven or irregular position may be maintained upright through cooperation of the first fixing member 42, the first shafts 44, the second shafts 45, and the second fixing member 43.

In an example, the first shafts 44 may be fixedly connected to the bracket 41, and the first fixing member 42 may be rotatably connected to the first shafts 44. In another example, the first shafts 44 may be fixedly connected to the first fixing member 42, hemispherical grooves are provided at opposite positions of the bracket 41, and the first fixing member 42 is rotatably connected to the bracket 41 through the first shafts 44. The first fixing member 42 and the bracket 41 may also be rotatably connected by other means, which is not limited in this embodiment. Specific implementations of the above rotatable connection are also applicable to the first fixing member 42 and the second fixing member 43, which is not repeated in this embodiment, but does not affect the understanding of those skilled in the art.

Figure 4:
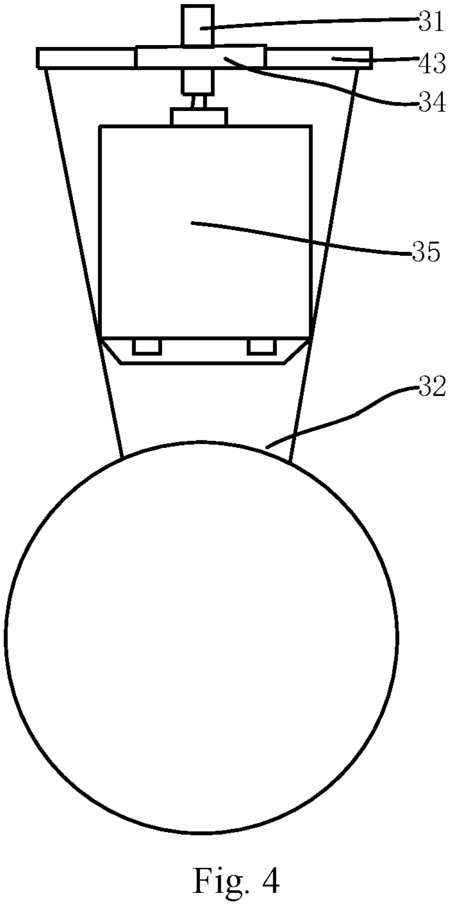
FIG. 4 is a partial schematic structural diagram of another embodiment of a zenith angle measuring device of the present disclosure.

Specifically, FIG. 4 is a partial schematic structural diagram of a zenith angle measuring device of the present disclosure. With reference to FIG. 2 to FIG. 4, the bracket 41 may include a fixing ring 411 and at least three legs 412, the first fixing member 42 and the second fixing member 43 are of ring structures and are concentric with the fixing ring 411, the at least three legs 412 are connected to the fixing ring 411 at equal intervals in a circumferential direction of the fixing ring 411, the second counterweight member 32 is placed in a space formed by the fixing ring 411 and the legs 412, and the two first shafts 44 are coaxial with a diameter of the fixing ring 411 and are connected to the fixing ring 411 respectively; and the two second shafts 45 are coaxial with a diameter of the first fixing member 42 and are connected to the first fixing member 42 respectively.

In this embodiment, the bracket 41 may be of a hollow round table structure, or a combined structure of the legs 412 and the fixing ring 411. In this embodiment, the at least three legs 412 are provided to support the zenith angle measuring device of this embodiment, provide an accommodating space for the second counterweight member 35, and provide an activity space for rotation of the first fixing member 42 and the second fixing member 43. In addition, the at least three legs 412 may be suitable for various placement positions, have a wider scope of application than a closed ring structure and a circular plate structure, are easier to fix, and facilitate an operation.

The above description is only the preferred embodiment of the present disclosure and is not intended to limit the present disclosure, and various modifications and changes may be made in the present disclosure for those skilled in the art. Any modification, equivalent replacement, improvement, and the like made within the spirit and principle of the present disclosure should fall within the protection scope of the present disclosure.

We claim:

1. A measuring device of zenith angle, comprising: a light receiving member (1), comprising solar panels (11), a support frame (12) having inclined planes, and a first counterweight member (13), wherein the support frame (12) is of a regular pyramid structure, a corresponding position of the inclined planes of the support frame (12) are covered by the solar panels (11), the first counterweight member (13) is connected to the support frame (12), and a mass of the first counterweight member (13) matches the mass of the solar panels (11) and the support frame (12); light intensity processing circuits (2) electrically connected to the solar panels (11) and configured to determine a rotating angle of the support frame (12) based on intensity of light received by the solar panels (11); a direction adjusting member (3) electrically connected to the light intensity processing circuits (2) to adjust angles of the support frame (12) in a vertical direction and a horizontal direction, wherein the angles of the support frame (12) in the vertical direction include a zenith angle; and a stability maintaining base (4), comprising a bracket (41), a first fixing member (42), and a second fixing member (43), wherein the first fixing member (42) is rotatably connected to the bracket (41), the second fixing member (43) is rotatably connected to the first fixing member (42), and the direction adjusting member (3) is rotatably connected to the second fixing member (43).

2. The measuring device according to claim 1, wherein the direction adjusting member (3) comprises a shaft rod (31) and a second counterweight member (32), wherein the second counterweight member (32) is fixedly connected to the second fixing member (43), a first motor (33) is fixed to a first end of the shaft rod (31), and a power output shaft of the first motor (33) is fixedly connected to the support frame (12) and the first counterweight member (13); the shaft rod (31) is fixedly connected to a turntable (34), and the turntable (34) is rotatably connected to the second fixing member (43); and a second motor (35) is fixed to the second counterweight member (32), and a power output shaft of the second motor (35) is fixedly connected to a second end of the shaft rod (31).

3. The measuring device according to claim 2, wherein first shafts (44) are connected to two opposite positions of the bracket (41) respectively, and the first shafts (44) are arranged coaxially; second shafts (45) are connected to two opposite positions of the first fixing member (42) respectively, and the second shafts (45) are arranged coaxially; and the first shafts (44) and the second shafts (45) are perpendicular to each other.

4. The measuring device according to claim 3, wherein the bracket (41) comprises a fixing ring (411) and at least three legs (412), the first fixing member (42) and the second fixing member (43) are ring structures and are concentric with the fixing ring (411), the at least three legs (412) are connected to the fixing ring (411) at equal intervals in a circumferential direction of the fixing ring (411), the second counterweight member (32) is placed in a space formed by the fixing ring (411) and the legs (412), and the first shafts (44) are coaxial with a diameter of the fixing ring (411) and are connected to the fixing ring (411) respectively; and the second shafts (45) are coaxial with a diameter of the first fixing member (42) and are connected to the first fixing member (42) respectively.

5. The measuring device according to claim 2, wherein the first motor (33) and the second motor (35) are electrically connected to the solar panels (11), respectively.

6. The measuring device according to claim 5, wherein diodes are arranged between the solar panels (11) and the first motor (33), and between the solar panels (11) and the second motor (35), respectively.

7. The measuring device according to claim 2, wherein a protractor (5) is fixed to the shaft rod (31), a pointer (6) is fixed to the support frame (12), and the pointer (6) indicates the zenith angle on the protractor (5).

8. The measuring device according to claim 1, wherein the support frame (12) is a regular square pyramid, wherein a difference in the intensity of light received by one group of the solar panels (11) arranged on opposing inclined planes determines the rotating angle of the support frame (12) in the vertical direction; and the difference in the intensity of light received by another group of the solar panels (11) arranged on apposing inclined planes determines the rotating angle of the support frame (12) in the horizontal direction.

* * * * *